United States Patent
Guo et al.

(10) Patent No.: US 8,930,699 B2
(45) Date of Patent: Jan. 6, 2015

(54) SHORT-RANGE SECURE DATA COMMUNICATION METHOD BASED ON SOUND WAVE OR AUDIO, AND APPARATUS THEREOF

(75) Inventors: Shunri Guo, Shanghai (CN); Zhuo Lin, Shanghai (CN)

(73) Assignee: Shunri Guo and Shanghai Cloudway Information Technology Co., Ltd., Shanghai (CN)

( * ) Notice: Subject to any disclaimer, the term of this patent is extended or adjusted under 35 U.S.C. 154(b) by 109 days.

(21) Appl. No.: 13/806,076
(22) PCT Filed: Jun. 22, 2011
(86) PCT No.: PCT/CN2011/076106
§ 371 (c)(1), (2), (4) Date: Dec. 20, 2012
(87) PCT Pub. No.: WO2011/160584
PCT Pub. Date: Dec. 29, 2011

(65) Prior Publication Data
US 2013/0091359 A1 Apr. 11, 2013

(30) Foreign Application Priority Data
Jun. 22, 2010 (CN) .......................... 2010 1 0205532

(51) Int. Cl.
H04L 9/08 (2006.01)
H04L 9/32 (2006.01)
H04L 29/06 (2006.01)
H04W 12/02 (2009.01)
H04W 12/00 (2009.01)
H04W 12/10 (2009.01)

(52) U.S. Cl.
CPC ................ *H04L 9/32* (2013.01); *H04L 63/162* (2013.01); *H04W 12/02* (2013.01); *H04L 9/3247* (2013.01); *H04W 12/00* (2013.01); *H04L 9/3228* (2013.01); *H04L 9/3297* (2013.01); *H04L 2209/805* (2013.01); *H04W 12/10* (2013.01)
USPC ....................................................... 713/171

(58) Field of Classification Search
CPC ................... G06F 17/30; G06F 17/60
USPC ............................................ 713/171; 726/30
See application file for complete search history.

(56) References Cited

U.S. PATENT DOCUMENTS

| 8,719,591 | B1 * | 5/2014 | Emigh et al. .................. 713/193 |
| 2006/0005018 | A1 * | 1/2006 | Alculumbre .................. 713/165 |
| 2007/0162981 | A1 * | 7/2007 | Morioka et al. ............... 726/30 |
| 2010/0217985 | A1 * | 8/2010 | Fahrny et al. ................. 713/169 |

FOREIGN PATENT DOCUMENTS

| CN | 99808078.0 A | 8/2001 |
| CN | 101043320 A | 9/2007 |

(Continued)

OTHER PUBLICATIONS

International Search Report prepared by the State Intellectual Properly Office, the P.R. China as International Searching Authority for PCT International Patent Application No. PCT/CN2011/076106, mailed Oct. 13, 2011, 6 pages.

*Primary Examiner* — Teshome Hailu
*Assistant Examiner* — Thanh Le
(74) *Attorney, Agent, or Firm* — Swanson & Bratschun, L.L.C.

(57) ABSTRACT

The present invention discloses an apparatus, a system and a method for short-range sound wave communication. The system realizes non-contact secure transmission by using the sound wave as the data transmission medium, and also can realize a reliable and secure data link directly through an audio connection. The invention systematically constructs multiple end-to-end transmission verification mechanisms for the process of data transmission: transmission data integrity verification, valid time verification, password verification, service data verification and data encryption; and according to the security level of the data, the sending end specifies the requirements for encryption and data verification in the transmission data so as to notify the reception end which verifications should be performed to the data packets, how to perform the verifications, etc. By using the same verification processing manner, operations can be performed to the data (e.g. the payment and settlement function of an account).

16 Claims, 3 Drawing Sheets

(56) References Cited

FOREIGN PATENT DOCUMENTS

| | | | |
|---|---|---|---|
| CN | 10080253.4 A | 8/2008 | |
| CN | 101443722 A | 5/2009 | |
| WO | 2004-023366 A1 | 3/2004 | |
| WO | WO 2004023366 A1 * | 3/2004 | ............. G06F 17/60 |

* cited by examiner

SHORT-RANGE SECURE DATA COMMUNICATION METHOD BASED ON SOUND WAVE OR AUDIO, AND APPARATUS THEREOF

CROSS REFERENCE TO RELATED APPLICATION

The present application is a Section 371 National Stage Application of International Application No. PCT/CN2011/076106, filed on Jun. 22, 2011, which claims priority to Chinese patent application No. 201010205532.0, filed on Jun. 22, 2010, and entitled "SHORT-RANGE SECURE DATA COMMUNICATION METHOD BASED ON SOUND WAVE OR AUDIO, AND APPARATUS THEREOF", the entire disclosure of which is incorporated herein by reference.

FIELD OF THE DISCLOSURE

The present disclosure generally relates to data communication field, and more particularly, to a short-range communication method and a device thereof based on sound wave or audio.

BACKGROUND

At present, communication technologies like Bluetooth, Infrared Data Association (IrDA), Near Field Communication (NFC) and Radio Frequency Identification (RFID) are widely used in short-range communication, all of which applies electromagnetic wave. The Bluetooth technology needs users' participation to establish a communication connection, thus is not suitable for applications requiring rapid transmission (e.g., settlement and payment). Further, Bluetooth chips are typically very expensive and have a poor anti-interference capability. The IrDA technology is a kind of line-of-sight transmission, which thereby has its inherent deficiency, that is, devices communicating with each other should be aligned mutually and without separating object therebetween. Thus the IrDA technology is adapted for the communication connection between two devices (not for multiple devices), however, with a poor reliability, security, anti-interference and low data transmission rate. NFC technology, working at a frequency of 13.56 MHz within 20 cm, employs bi-directional identification and connection, and is currently considered to be the most secure short-range communication technology. However, the number of devices that supports NFC is still far from reaching the critical mass. RFID is currently widely applied in small amount payments, like public transportation cards, because of its low cost and reliable technology protocols. An alternative solution is to embed or stick specific RFID chips to user's carry on mobile device. It takes time and cost to roll it out to the mass. Barcodes, including a one-dimensional barcode and a two-dimensional barcode, are also common short-range scanning data transmission solutions. For one-dimensional barcode, it costs low in scanner, but scanners have a low accuracy in recognizing electronic displaying barcodes. For two-dimension barcode, it has good fault tolerance and recognition accuracy, but it costs high in scanning terminals because of a need for macro lenses, has a large number of standards, works unsatisfactorily in scanning time, and has specific requirements for client's display. The table below illustrates applicability of the technologies mentioned above to the requirement of the short-range communication between a mobile terminal and a commercial cashier system. Currently, there is no perfect technology meeting all the requirements shown in the table. A system and method of data communication based on non-contact sound wave or audio transmission according to the present disclosure has a better applicability.

| requirement technology | reliability | security | Universality | User's cost | Business cost | Transmission time | payment |
|---|---|---|---|---|---|---|---|
| Bluetooth | high | high | medium | low | medium | slow | Yes |
| IrDA | low | low | low | Non-support | medium | slow | No |
| NFC | high | very high | low | high | medium | quick | Yes |
| RFID | high | high | low | low | high | quick | Yes |
| Barcode scanning | medium | low | high | 0 | medium | medium | No |
| 2-D barcode scanning | high | low | high | 0 | high | slow | No |
| present sound solution | high | Medium/high | high | 0 | low | medium | Yes |

There are some patents referring to sound wave application in data communication, such as Chinese patent application 99808078.0 by SIEMENS, and Chinese patent application 200710080253.4, entitled "Transmitter and receiver based on ultrasound, system and method using the same". Both of the applications relates to transmission accomplished by using specific ultrasound wave (a specific frequency of sound wave). A problem existing in the sound wave solution is poor security, which is a price paid for the convenience of transmitting through the air, that is, sound is easily to be duplicated by recording, which limits the progress of sound wave as the secure data transmission medium to applications less sensitive to secure data.

FIG. 1 illustrates a situation that sound wave is recorded when transmitting. In FIG. 1, the serial number in circle is in the order of time.

1a describes that a user plays coded sonic signals via a speaker in a mobile phone, and the data information (e.g., discount code) is transmitted to a cashier terminal, or to a receiver connected to the cashier terminal for receiving audio data or sonic data.

1b describes that a malicious user in the vicinity records the sonic signals transmitted through the air by using a hypersensitive recording device.

2 describes that the malicious user plays the recorded sonic signals to a cashier terminal, or to a receiver connected to the cashier terminal for receiving audio data or sonic data using a mobile phone or other specific mobile devices, intending to pay by using the settlement account information (discount coupon or payment card) of previous mobile user.

Therefore, there is a need for a secure transmission link which has ability to identify and prevent a potential safety hazard.

SUMMARY

Embodiments of the present disclosure provide a short-range communication method and a device thereof based on sound wave or audio frequency, to solve the poor security problem of sound wave transmission technology in the conventional technology.

One embodiment of the present disclosure provides a short-range communication method based on sound wave or audio frequency. The method includes: implementing a non-contact short-range transmission by using sound wave as a data transmission medium, or through an audio connection, where a transmitter terminal states a verification and a encryption manner in a data package to be transmitted.

In some embodiments, the verification manner may include one of data integrity verification, valid time verification, password verification, service data verification and any combination thereof.

In some embodiments, the data integrity verification may include adding an integrity verification code including a time stamp, a data verification manner or any combination thereof to data which needs data integrity verification.

In some embodiments, the integrity verification code may include Hashing for Message Authentication (HMAC), digital signature based on asymmetric cryptography, or a combination thereof.

In some embodiments, the valid time verification may include one of group (1) or group (2), or any combination of one of group (1) and group (2): (1) a starting valid date, a starting valid time, a combination of the starting valid date and the starting valid time, or a time stamp of an appearance of data by default; (2) a valid time period, an expiration date, an expiration time, or a combination of the expiration date and the expiration time.

In some embodiments, in the password verification, the transmitted data may contain a password as required, which is only known to a user, and a verification is needed at the time a receiving terminal receives the sonic data or audio data.

In some embodiments, the password and the transmitted data may be combined in one of following three manners or any combination thereof, and the three manners may be: A) the password is used as an additional secret key for encrypting or transforming original data, and at the receiving terminal, the password is needed for decryption or reverse transformation; B) the password is used as an unsymmetrical encrypted private key and the transmitted data is encrypted using a public key corresponding to the password, and at the receiving terminal, the password is required to provide to decrypt the data; C) the password is used as a part of the original data to transform or encrypt using a certain algorithm, and at the receiving terminal, the original data and the password are received, and a verification is applied directly to the password to prove the data's validity.

In some embodiments, the password is generated dynamically by a data source, and the user may obtain the password in plain code when obtaining coded sonic data.

In some embodiments, the password is a personal secret key of the user, and the data source automatically codes the secret key into data to be transmitted.

In some embodiments, the service data verification is implemented at the receiving terminal which verifies and compares the transmission data with the stored service data as required.

In some embodiments, the encryption manner may include encrypting data as required at the receiving terminal, and the encryption manner may include one of the followings or any combination thereof: the transmitting and receiving terminals share secret keys defined in advance, generation rules of secret keys, and sequences of secret keys, and the secret keys may be updated regularly in a shared server; a personal password of the user or a password generated instantly, and at the receiving terminal, the password is required for decryption; and a one-time password generated at the receiving terminal, the one-time password is needed for encrypting data at the transmitting terminal, and is transmitted to the receiving terminal within a preset time.

In some embodiments, the method may be used in applications between mobile terminals, or between a mobile terminal and a commercial cashier terminal or any other terminal of commercial applications.

In some embodiments, the method is directed to applications of mobile discount coupons, mobile membership cards or mobile payments.

Another embodiment of the present disclosure provides an apparatus for implementing the short-range communication method based on sound wave or audio frequency described above.

Compared with the prior art, embodiments of this disclosure have the following advantages:

The present disclosure employs sound wave as a data transmission medium to realize a non-contact short-range transmission, or through an audio connection. The transmitter terminal states a verification and a encryption manner in a data package to be transmitted. Thus, it has convenience and cost advantages of sound wave/audio frequency communication and raises a security threshold in technique, which thereby obviates the disadvantage that the sound wave signal is easy to be recorded and is applicable for a broad range of applications, even for a small amount payment system.

where [1] represents a malicious user who "steals" settlement information; [2] represents a user who is settling using a mobile phone; [3] represents a receiver for receiving audio data or sonic data; and [4] represents a POS terminal.

Figure 1:
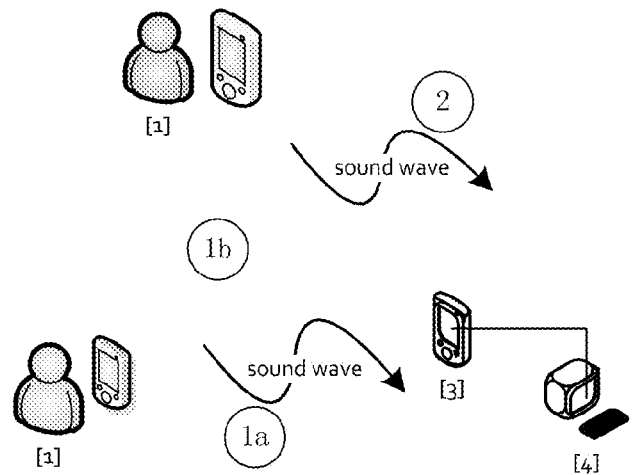
FIG. 1 illustrates a potential security hazard by using sound wave transmission.
Figure 2:
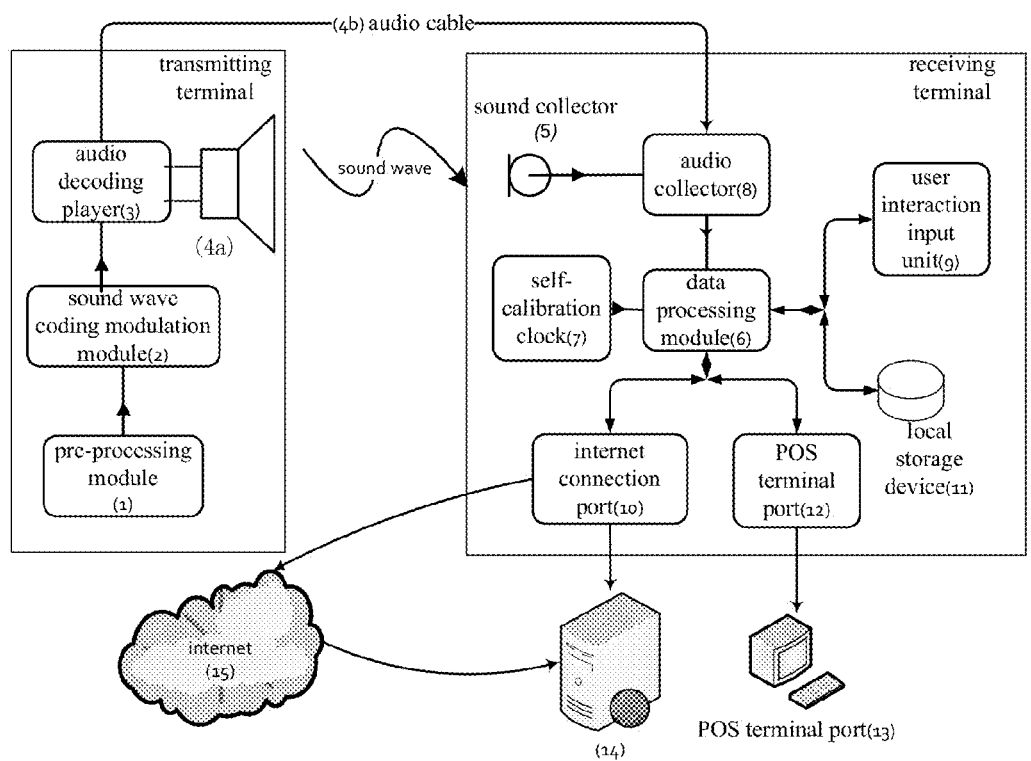
Figure 3:
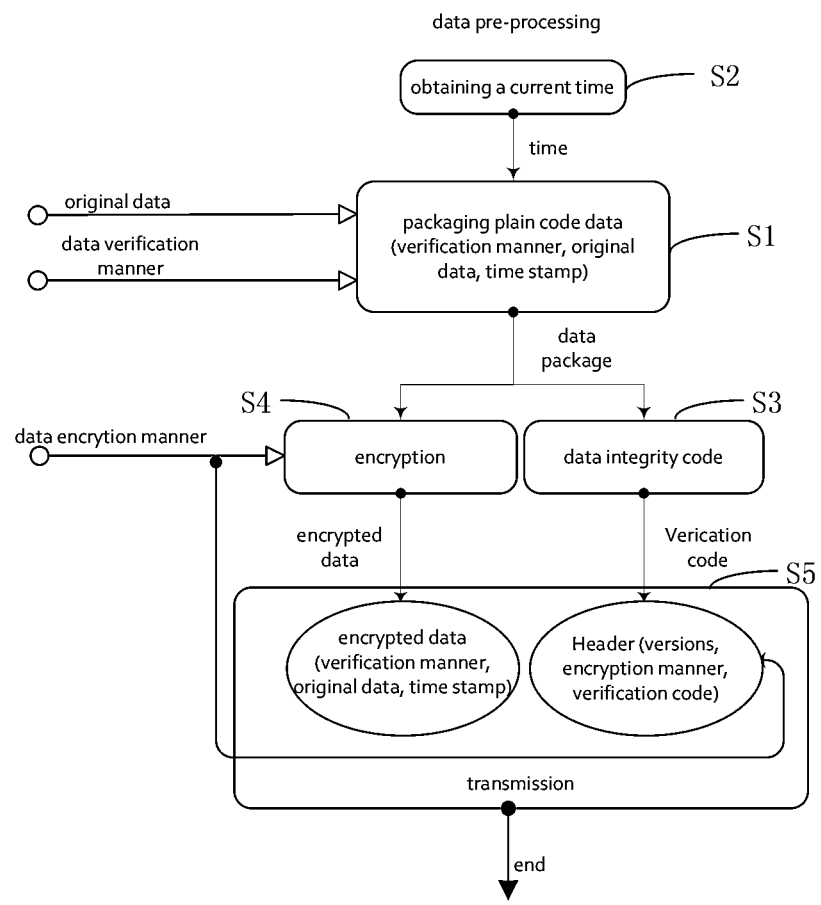
Figure 4:
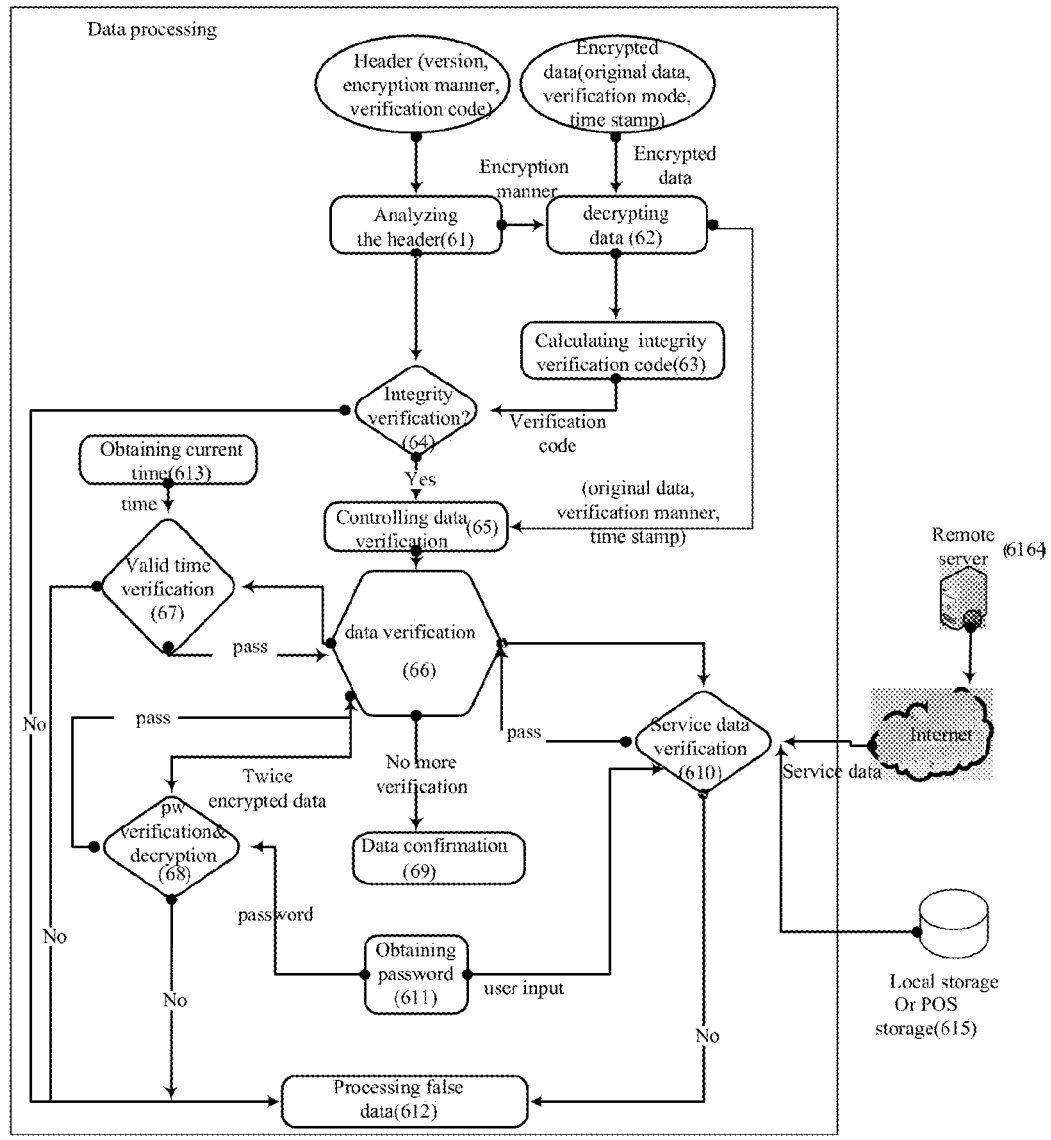

FIG. 2 illustrates a schematic structural diagram of a communication system using sound wave or audio frequency according to one embodiment of the present disclosure;

FIG. 3 illustrates a flow chart of pre-processing data according to one embodiment of the present disclosure; and FIG. 4 illustrates a flow chart of processing data at the receiving terminal according to one embodiment of the present disclosure.

DETAILED DESCRIPTION OF THE DISCLOSURE

Embodiments of the present disclosure will be described in detail in conjunction with the accompanying drawings. The illustrative embodiments described in the detailed description are not meant to limit the scope of the application.

Embodiments of the present disclosure realizes a non-contact transmission by using sound wave as a data transmission medium, or realizes a secure data link through an audio connection. The present application aims to establish multiple end-to-end transmission verification mechanisms in the process of transmission, which include data integrity verification, valid time verification, password verification, service data verification and combinations thereof, and data encryption.

1. Data Integrity Verification

By adding an integrity verification code, such as a valid time, to a data package which is to be transmitted, it is possible to prevent a malicious user from tampering the data package. The integrity verification code may be used for pre-encrypted or post-encrypted data, and it must include verification information, such as a time stamp, a data verification manner or any combination thereof, which is important to the integrity verification code. The integrity verification code may employ HMAC, (Hashing for Message Authentication (http://en.wikipedia.org/wiki/HMAC), such as HMAC-MD5, or HMAC-SHA-1), digital signature based on asymmetric cryptography (http://en.wikipedia.org/wiki/Digital_signature), or a combinations thereof to give digital signature to the data package.

2. Valid Time Verification

A time stamp is added to the transmitted data package, further, a valid time may be defined according to a data attribute. For example, the valid time may include one of members of group (1) or one of members of group (2).

(1) a starting valid date, a starting valid time, a combination of the starting valid date and the starting valid time, or a time stamp of an appearance of data by default.

(2) a valid time period, an expiration date, an expiration time, or a combination of the expiration date and the expiration time.

The valid time period may be 15 seconds, 1 minute, one hour etc.

The valid time may include any combinations of one of group (1) and group (2).

In this way, data validation may be verified at a receiving terminal. A malicious recorded data may be approved by the receiving terminal only in the event that the recorded data is transmitted to the receiving terminal within a valid time period. The more sensitive the data, the shorter the valid time period, such that the possibility of reusing the data can be reduced.

3. Password Verification

The transmitted data may contain a password as required which is only known to a user, and a verification is needed at the time the receiving terminal receives the sonic data or audio data. The password scheme makes the recorded data useless due to unknowing the original password. In practice, the password may be presented in two ways:

the password is generated dynamically by a data source, and the user may obtain the password in plain code when obtaining coded sonic data (audio data). At the receiving terminal, the user is needed to input the password to prove the data's validity or obtain an integrated data.

the password is a personal secret key of the user, the data source automatically codes the secret key into data to be transmitted. At the receiving terminal, the user is needed to input the password to prove the data's validity or obtain an integrated data.

The password and the transmitted data may be combined in one of three manners or any combinations thereof. The three manners may be:

the password is used as an additional secret key for encrypting or transforming original data, and at the receiving terminal, the password is needed for decryption or reverse transformation.

the password is used as an unsymmetrical encrypted private key and the transmitted data is encrypted using a public key corresponding to the password, and at the receiving terminal, the password is required to provide to decrypt the data.

the password is used as a part of the original data to transform or encrypt using a certain algorithm, and at the receiving terminal, the original data and the password are received, and a verification is applied directly to the password to prove the data's validity.

At the receiving terminal, a keyboard or other suitable input devices are needed for receiving the user's input for password verification.

4. Service Data Verification

The service data verification is implemented at the receiving terminal which verifies and compares the transmission data with the stored service data to ensure safety and validity of data. The service data is associated with a specific service, such as information of membership card, dynamic generation code library, user consumption record, user account information and information of service and product, etc. In practical application, the service data verification may be implemented in two ways:

Data Verification Based on a Valid Usage Frequency

Due to a limit of system resource or a limit of relevant data application, in most cases, a same data can not be repeatedly used unlimitedly. For example, a discount coupon is limited to one or more times usage at one mobile terminal. Accordingly, information about number of uses is required to be recorded in a server or in the receiving terminal. Further, the use of the transmitted data may be interacted with remote or local service data, such that the number of uses is limited within the valid usage frequency.

Data Verification Based on Relevance Information

The transmitted data contains an identifier of relevance information and information which needs for verification. According to the identifier of relevance information, the server may obtain the relevant verification information which is then used to verify the inputted information of user verification from the receiving terminal to confirm data's validity and user's legality. Real-time password verification at the server is a kind of data verification based on relevance information. For example, the user may be required to input relevant registered information, e.g., birthday or the user's registration number, for verification.

The data verification based on relevance information needs interaction with users, which may not needed for the data verification based on a valid usage frequency. The service data may store in a local receiving terminal, a local POS terminal, or a remote server. In the process of interaction with service data, certain data manipulation may be implemented, such as payment, transaction record.

5. Data Encryption

The data may be encrypted at the receiving terminal to prevent personal key information, such as credit card number or ID number, from being monitored in transit. The transmitting terminal may state an encryption manner and relevant parameters thereof (or may use specified default value). As such, the receiving terminal may use a corresponding decryption manner to process the data. The encryption manner may use symmetric encryption (http://en.wikipedia.org/wiki/Symmetric_encryption), or asymmetric cryptography (http://en.wikipedia.org/wiki/Public-key_cryptography). Secret key employed by encryption and decryption may be one of the types or any combinations thereof.

- a secret key defined in advance, and the secret key or generation rules and sequences of the secret key are shared by the transmitting and receiving terminals, and the secret key may be updated regularly in a shared server.
- a personal password of the user or a password generated instantly, and at the receiving terminal, the password is required for decryption.
- a one-time password generated at the receiving terminal, the one-time password is needed for encrypting data at the transmitting terminal, and is transmitted to the receiving terminal within a preset time.

Before transmitting, data needs to be pre-processed which may includes: packaging the data to a specific format which is compatible with the receiving terminal, adding an integrity verification code to the data package, and encrypting the data as required. The pre-processed data package needs to state a verification (one verification manner or combination of multiple manners) and a encryption manners. In this way, a transmission and a verification manners can be adjusted according to a safety attribute of the data. For example, a discount code with lower discount price needs no encryption due to a lower requirement for security, which only needs a valid time verification or a unique service data verification with a remote server. However, for a discount code with higher discount price, a password verification may be used in addition to the above verifications for the discount code with lower discount price. For information of small amount payment, it is needed not only for the password verification but for encryption data. Therefore, the communication method of this application is able to meet transmission requirements of various security levels.

By using the method of the application, small-data communication using sound wave can be realized reliably and securely in the case of low cost. The method may be used in non-contact short-range small-data communication applications (or through an audio connection) between a mobile terminal (e.g., a mobile phone, a notebook PC, or a tablet computer) and a commercial cash terminal (e.g., a POS terminal or a terminal for managing membership card). Schemes may be integrated (such as quick collection of a discount code, a membership card and a small amount payment card number) in the case of low cost without the need of hardware transformation for large number of user's mobile terminals (such as a support for additional NFC chip, RFID chip etc.)

As described above, Embodiments of the present disclosure provide a short-range communication method based on sound wave or audio frequency, which includes:

1) implementing a non-contact short-range transmission by using sound wave as a data transmission medium, or through an audio connection;

2) a transmitting terminal states a verification (one manner or a combination of multiple manners) and a encryption manners in a data package to be transmitted, such that the transmission and verification manners can be adjusted according to the safety attribute of the data.

In some embodiments, an integrity verification code may be added to the data package, thereby preventing a malicious user from tampering the data package, such as a valid time. The integrity verification code may be used for pre-encrypted or post-encrypted data, and it must include verification information, such as a time stamp or a data verification manner, which is important to the integrity verification code. The integrity verification code may include HMAC, (Hashing for Message Authentication, such as HMAC-MD5, or HMAC-SHA-1), digital signature based on asymmetric cryptography, or combinations thereof to give a digital signature to the data package.

In some embodiments, data timeliness may be verified as required at a receiving terminal A malicious recorded data may be approved by the receiving terminal only in the event that the recorded data is transmitted to the receiving terminal within a valid time period. The more sensitive the data, the shorter the valid time period, such that the possibility of reusing the data can be reduced.

In some embodiments, the transmitted data may contain a password as required which is only known to the user (the password may be generated dynamically by a data source or may be a personal secret key of the user). And a verification is needed when the receiving terminal receives the sonic data or audio data. The password scheme makes the recorded data useless due to unknowing the original password.

In some embodiments, the password and the transmitted data may be combined in one of three manners or any combinations thereof:

1. The password is used as an additional secret key for encrypting or transforming original data, and at the receiving terminal, the password is needed for decryption or reverse transformation.

2. The password is used as an unsymmetrical encrypted private key and the transmitted data is encrypted using a public key corresponding to the password, and at the receiving terminal, the password is required to provide to decrypt the data.

3. The password is used as a part of the original data to transform or encrypt using a certain algorithm, and at the receiving terminal, the original data and the password are received, and a verification is applied directly to the password to prove the data's validity.

In some embodiments, service data verification is implemented at the receiving terminal which verifies and compares the transmission data with the stored service data as required to ensure safety and validity of data.

In some embodiments, the data may be encrypted at the receiving terminal to prevent personal key information, such as credit card number or ID number, from being monitored in transit.

In some embodiments, the method described above may be used in non-contact short-range small-data communication applications (or through an audio connection) between a mobile terminal (e.g., a mobile phone, a notebook PC, or a tablet computer) and a commercial cash terminal (e.g., a POS terminal or a terminal for managing membership card), such as applications of a mobile discount coupon, a mobile membership card and a mobile payment.

Another embodiment of the present disclosure provides a device or system using the short-range communication method based on sound wave or audio frequency described above.

FIG. 2 illustrates a schematic structural diagram of a communication system using sound wave or audio frequency.

Referring to FIG. 2, a pre-processing module 1 is adapted to package data in security at a transmitting terminal. A sound wave coding modulation module 2 is adapted to convert the data package to an audio file (e.g., MP3, Wav). An audio decoding player 3 or other related programs component is adapted to transmit an audio signal with the modulated audio file to a speaker 4a. The speaker 4a broadcasts the audio signal. At the receiving terminal, a sound collector (Microphone) 5 collects sound from the transmitting terminal. The collected sound is converted to the audio signal which is then transmitted to an audio collector 8. Optionally, such process may be implemented by transmitting the audio signal directly through an audio cable 4b to the audio collector 8. The audio collector 8 demodulates the audio signal to a data signal for data verification and operation by a data processing module 6. The data processing module 6 may obtain a current time from a self-calibration clock 7 according to the data verification and operation. The data processing module 6 may receive user's input information from a user interaction input unit 9 and simultaneously output feedback information to the user interaction input unit 9. Optionally, the data processing module 6 may be coupled to a local storage device 11 (e.g., a file system or a LAN resource) for data access and operation. Optionally, the data processing module 6 may exchange data with a remote server 14 through an internet connection port 10 to achieve data verification and operation. In addition, the processed data may be sent to a POS terminal 13, like a cash terminal, through a POS terminal port 12 for related data operation.

The modules described above are logic functional unit. In practice, the pre-processing module 1 and sound wave coding modulation module 2 may be mounted in a mobile phone at a client-side (e.g., generating a real-time audio file about a discount code at the client-side). Alternatively, the corresponding audio file may be generated at a remote server-side, which is then sent to the client-side. Similarly, the receiving terminal may not be an independent hardware device, which may be mounted in a cash terminal or be integrated with a cash terminal.

The pre-processing module 1 is important to the communication system in FIG. 2. To ensure safety and reliability of data transmission, the data must be pre-processed before being transmitted. The pre-processing may includes: packaging the data to a specific format which is compatible with the receiving terminal, adding an integrity verification code to the data package, and encrypting the data as required.

The following provides a key point and a typical design of pre-processing data in FIG. 3.

Data Stating a Verification and a Encryption Manners

A transmission and a verification manners can be adjusted according to a safety attribute of the data. For example, a discount code with lower discount price needs no encryption due to a lower requirement for security, which only needs valid time verification or unique service data verification with remote database. However, for a discount code with higher discount price, password verification may be used in addition to the verifications for discount code with lower discount price. For information of small amount payment, it is needed not only for password verification but for encryption data. Therefore, the communication method is able to meet transmission requirements of various security levels.

Data Integrity Verification

An integrity verification code must be added to a data package, thereby preventing a malicious user from tampering the data package, such as a valid time. The integrity verification code may be used for pre-encrypted or post-encrypted data, and it must include verification information, such as a time stamp or a data verification manner, which is important to the integrity verification code. The integrity verification code may employ HMAC, (Hashing for Message Authentication, such as HMAC-MD5, or HMAC-SHA-1), digital signature based on asymmetric cryptography, or combinations thereof to give a digital signature to the data package.

Packaging a Time Stamp Automatically

The data package may contain a transmitting time, which may be recorded at the receiving terminal. And the time stamp may serve as a key basic data for valid time verification.

FIG. 3 illustrates a flow chart of pre-processing data. The method of pre-processing data may include: S1, packaging an original data resource including original data and a data verification manner needed by the receiving terminal; S2, adding a time stamp to the data package by obtaining a current time; S3, calculating an integrity verification code for the integrated data package (signature of the data package); if data encryption is needed, then the method proceeds to S4, encrypting the data package to form a encrypted data; and S5, packaging the encrypted data, where the final data package includes a header and an encrypted data segment. The header is in the form of plain code, which may include:

version number of data format: stating format versions of data, and selecting a format of a specific version for analysis data at the receiving terminal;

data encryption manner and related parameters: selecting a predetermined encryption algorithm or no encryption;

integrity verification code: HMAC (Hashing for Message Authentication) or digital signature based on asymmetric cryptography The encrypted data segment may contain key data information (if data encryption is not needed, the data segment is in the form of plain code). The encrypted data segment may include:

original data a data verification manner and related parameters a time stamp

The sound wave coding modulation module 2 may employ a DTMF (Dual-tone multi-frequency signaling) signal transmission method which has an excellent anti-noise performance (http://en.wikipedia.org/wiki/DTMF), to coding digital signals into 0 to 15 corresponding to 16 signals in DTMF, which is then modulated into an audio file (e.g., wav or mp3).

The audio decoding player 3 may be an audio player built in the client-side, or may be an audio playing component controlled by programs, or may be a playing program for reading polyphonic ringtone in a mobile phone.

The audio collector 8 may reversely demodulate the collected audio signal to data according to a rule corresponding to the coding rule of the sound wave coding modulation module 2. In some embodiments, a pure software scheme may be used by using a rapid algorithm for decoding DTMF signal software (http://emuch.net/journal/article.php?id=CJFDTotal-TXJS200305000) to decode DTMF signal.

The decoded data may be sent to the data processing module 6 at the receiving terminal for data verification and operation. FIG. 4 illustrates a flow chart of processing data at the receiving terminal according to one embodiment of the present disclosure. The data processing module 6 may decrypt the decoded data according to the encryption manner in the header of the data package (if no encryption, the original data is obtained). Then the data processing module 6 calculates an integrity verification code based on the decrypted data and verifies the data's integrity. If the data satisfies the data integrity verification, the data processing module 6 may perform data verification according to the verification manner which is stated in the transmitting data. In this way, data which satisfies all the verifications may be confirmed, which is then sent to a next application. For example, the confirmed data may be sent to a RS232 port of a cash terminal.

The method of data processing in FIG. 4 may be described in detail as follows.

In block 61, analyzing a header of a decoded data to obtain a version number of data format, a data encryption manner and related parameters, and an integrity verification code. An encrypted data segment in the decoded data may be processed in block 62. In block 62, decryption is performed according to the encryption manner in the header. The decrypted data may be processed in block 63 to calculate an integrity verification code. In block 64 of data integrity verification, by comparing the integrity verification code analyzed in block 61 with the integrity verification code calculated in block 63, if two of them are not the same, the data integrity verification fails. Then the method proceeds to block 612 of processing false data, and the process of data processing is finished. Only the data verification is satisfied, the decoded data can be confirmed to be correct in transit (including but not limited to: no error code or being tampered).

The data satisfying verification may be processed in block 65 of controlling data verification, to finish data verifications orderly in block 66 according to the data verification manner contained in the decrypted data.

In block 67, valid time verification is performed by comparing a defined valid time with a current time obtained in block 613. If not within the range of the valid time, the method proceeds to block 612 of processing false data, and the data processing is finished. Otherwise, returning to block 66 for other data verifications.

The data which is twice encrypted or transformed may be sent to block 68 for password verification and decryption. If it is needed for interaction with a user, in block 611, a user's password or related information may be obtained through a keyboard or an interactive terminal, which is then processed for password verification and decryption. If failing in password verification and decryption, the method proceeds to block 612 of processing false data, and the data processing is finished. Otherwise, the data succeeded in password verification and decryption may be considered as the original data, which is returned to block 66 for other data verifications.

In block 610, service data verification is performed. A server request may be generated based on a specified way of service data verification combined with related data to be verified. If it is needed for interaction with a user, in block 611, a user's password or related information may be obtained through a keyboard or an interactive terminal, to generate a corresponding server request. The related data to be verified may be stored in a local storage or be stored in a POS terminal, which may be obtained from block 615 of a local storage or a POS terminal shown in FIG. 4. The service data verification is performed by sending out the server request. The service data verification is succeeded if success information or corresponding verification information is returned. The method returns to block 66 for other data verifications. Otherwise, the method proceeds to block 612 of processing false data, and the data processing is finished.

In block 66, if all the data verifications are confirmed to be successful, the data are verified. In block 69 of data confirmation, the processed data are sent for subsequent processing.

To ensure the accuracy of valid time verification, time calibration may be taken into consideration, which requires synchronization between a clock of the transmitting terminal for packaging the original data and the clock of the receiving terminal (clock error should much less than the valid time period). Accordingly, the clocks at both ends are required to be synchronized with the standard clock. In practice, time synchronization may be achieved using one of the ways below:

Running system services provided by the operating system which are synchronous with an Internet time server or an operation network clock. High-end intelligent devices, such as a server or an intelligent mobile phone typically have this ability.

Installing and turning on application services which are synchronous with an Internet time server or an operation network clock, to ensure the accuracy of the local time.

Using clock auto-adjustment chip or clock auto-adjustment circuit (http://wenku.baidu.com/view/444ad322bcd126fff7050bc0.html). Time calibration is performed by obtaining a time signal using an ordinary radio circuit from a local time signal in radio broadcasting.

In addition, different time zones should be considered when comparing between the clocks at both ends. In some embodiments, a Universal Time Coordinated (UTC) may be used at both ends.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A short-range communication method based on sound wave or audio frequency, comprising:
   implementing a non-contact short-range transmission by using sound wave as a data transmission medium, or through an audio connection, where a transmitter terminal states a verification and an encryption manner in a data package to be transmitted, wherein the verification manner comprises one of data integrity verification, valid time verification, password verification, service data verification and any combination thereof, where the service data verification is implemented at a receiving terminal which verifies and compares transmission data with stored service data as required.

2. The method according to claim 1, where the data integrity verification comprises adding an integrity verification code comprising a time stamp, a data verification manner or any combination thereof to data which needs data integrity verification.

3. The method according to claim 2, wherein the integrity verification code comprises Hashing for Message Authentication (HMAC), digital signature based on asymmetric cryptography, or a combination thereof.

4. The method according to claim 1, where the valid time verification comprises one of group (1) or group (2), or any combination of one of group (1) and group (2):
   (1) a starting valid date, a starting valid time, a combination of the starting valid date and the starting valid time, or a time stamp of an appearance of data by default;
   (2) a valid time period, an expiration date, an expiration time, or a combination of the expiration date and the expiration time.

5. The method according to claim 1, where the transmitted data contains a password as required, which is only known to a user, and a verification is needed at the time a receiving terminal receives the sonic data or audio data.

6. The method according to claim 5, where the password and the transmitted data are combined in one of following three manners or any combination thereof, and the three manners comprise:
- A) the password is used as an additional secret key for encrypting or transforming original data, and at the receiving terminal, the password is needed for decryption or reverse transformation;
- B) the password is used as an unsymmetrical encrypted private key and the transmitted data is encrypted using a public key corresponding to the password, and at the receiving terminal, the password is required to provide to decrypt the data; and
- C) the password is used as a part of the original data to transform or encrypt using a certain algorithm, and at the receiving terminal, the original data and the password are received, and a verification is applied directly to the password to prove the data's validity.

7. The method according to claim 5, where the password is generated dynamically by a data source, and the user obtains the password in plain code when obtaining coded sonic data.

8. The method according to claim 5, where the password is a personal secret key of the user, and the data source automatically codes the secret key into data to be transmitted.

9. The method according to claim 1, where the encryption manner comprises encrypting data as required at the receiving terminal, and the encryption manner comprises one of the followings or any combination thereof:
- the transmitting and receiving terminals share secret keys defined in advance, generation rules of secret keys, and sequences of secret keys, and the secret keys are updated regularly in a shared server;
- a personal password of the user or a password generated instantly, and at the receiving terminal, the password is required for decryption; and
- a one-time password generated at the receiving terminal, the one-time password is needed for encrypting data at the transmitting terminal, and is transmitted to the receiving terminal within a preset time.

10. The method according to claim 1, where the method is used in applications between mobile terminals, or between a mobile terminal and a commercial cashier terminal or any other terminal of commercial applications.

11. The method according to claim 10, wherein the method is directed to applications of mobile discount coupons, mobile membership cards or mobile payments.

12. An apparatus for implementing short-range communication, comprising:
- a device configured to implement a non-contact short-range transmission by using sound wave as a data transmission medium, or through an audio connection, where a transmitter terminal states a verification and an encryption manner in a data package to be transmitted, wherein the verification manner comprises one of data integrity verification, valid time verification, password verification, service data verification and any combination thereof, where the service data verification is implemented at the receiving terminal which verifies and compares the transmission data with the stored service data as required.

13. The apparatus according to claim 12, where the data integrity verification comprises adding an integrity verification code comprising a time stamp, a data verification manner or any combination thereof to data which needs data integrity verification.

14. The apparatus according to claim 12, where the valid time verification comprises one of group (1) or group (2), or any combination of one of group (1) and group (2):
- (1) a starting valid date, a starting valid time, a combination of the starting valid date and the starting valid time, or a time stamp of an appearance of data by default;
- (2) a valid time period, an expiration date, an expiration time, or a combination of the expiration date and the expiration time.

15. The apparatus according to claim 12, where the transmitted data contains a password as required, which is only known to a user, and a verification is needed at the time the receiving terminal receives sonic data or audio data.

16. The apparatus according to claim 12, where the encryption manner comprises encrypting data as required at the receiving terminal, and the encryption manner comprises one of the followings or any combination thereof:
- the transmitting and receiving terminals share secret keys defined in advance, generation rules of secret keys, and sequences of secret keys, and the secret keys are updated regularly in a shared server;
- a personal password of the user or a password generated instantly, and at the receiving terminal, the password is required for decryption; and
- a one-time password generated at the receiving terminal, the one-time password is needed for encrypting data at the transmitting terminal, and is transmitted to the receiving terminal within a preset time.

* * * * *